(12) United States Patent
Diamond et al.

(10) Patent No.: US 7,789,376 B2
(45) Date of Patent: Sep. 7, 2010

(54) FENCING CONSTRUCTION APPARATUS AND METHOD

(75) Inventors: Mitchell Scott Diamond, Warrington, PA (US); Jerry D. Horne, Royersford, PA (US); Robert W. Major, Boonville, MO (US)

(73) Assignee: Allied Tube & Conduit Corporation, Harvey, IL (US)

( * ) Notice: Subject to any disclaimer, the term of this patent is extended or adjusted under 35 U.S.C. 154(b) by 0 days.

(21) Appl. No.: 11/753,252

(22) Filed: May 24, 2007

(65) Prior Publication Data

US 2008/0023684 A1  Jan. 31, 2008

Related U.S. Application Data (60) Provisional application No. 60/809,089, filed on May 26, 2006.

(51) Int. Cl.
*E04H 17/10* (2006.01)

(52) U.S. Cl. .................. 256/56; 256/54; 256/DIG. 3

(58) Field of Classification Search .................. 256/19, 256/21, 32, 45, 50, 54, 56, DIG. 3
See application file for complete search history.

(56) References Cited

U.S. PATENT DOCUMENTS

| 304,865 | A | * | 9/1884 | Scarles | 256/DIG. 3 |
|---|---|---|---|---|---|
| 1,057,260 | A | * | 3/1913 | Murray | 256/54 |
| 3,972,110 | A | * | 8/1976 | Sasena | 256/54 |
| 4,270,737 | A | * | 6/1981 | Binns et al. | 256/32 |
| 4,804,166 | A | * | 2/1989 | Makus | 256/54 |
| 5,476,266 | A | * | 12/1995 | Caruso | 473/478 |
| 5,676,351 | A | * | 10/1997 | Speece et al. | 256/54 |
| 5,921,530 | A | * | 7/1999 | Joyce et al. | 256/54 |
| 6,415,564 | B1 | * | 7/2002 | Beer | 256/54 |
| 2005/0218393 | A1 | * | 10/2005 | Larsen | 256/32 |

FOREIGN PATENT DOCUMENTS

| AU | 2001-77294 A1 | 4/2002 |
|---|---|---|
| DE | 34 22 049 | * 12/1985 |

* cited by examiner

*Primary Examiner*—Michael P Ferguson (57) ABSTRACT

A non-metallic fence system has a singular snap lock mechanism for permitting the easy construction of the fence.

4 Claims, 9 Drawing Sheets

FENCING CONSTRUCTION APPARATUS AND METHOD

This application cross references and claims priority to U.S. Provisional Patent Application No. 60/809,089 filed on May 26, 2006.

BACKGROUND OF THE INVENTION

1. Field of the Invention

The present invention pertains to non-metallic fences and the securing mechanisms thereof.

2. Brief Description of the Related Art

Convention metal fence systems are common. However, there is a need in the art to provide a resilient non-metallic fence system. The present invention addresses this and other needs.

SUMMARY OF THE INVENTION

The present invention includes a non-metallic fence system.

The present invention also includes a securing device for fixing a fabric to a fence having a rigid body including at least two prongs there from and an open face strut profile capable of receiving the prong therein, wherein the prongs are locked within the open face and the fixture can be removed by twisting 90 degrees.

Other features, advantages and embodiments of the invention will become apparent to those of ordinary skill in the art by the following description, accompanying examples and appended claims.

DETAILED DESCRIPTION OF THE INVENTION

The present invention is related to enhanced non-metallic fence designs. As such these novel configurations of the non-metallic fences offer a high quality effective multifunctional system capable of being utilized for a wide range of diverse applications.

Figure 1:
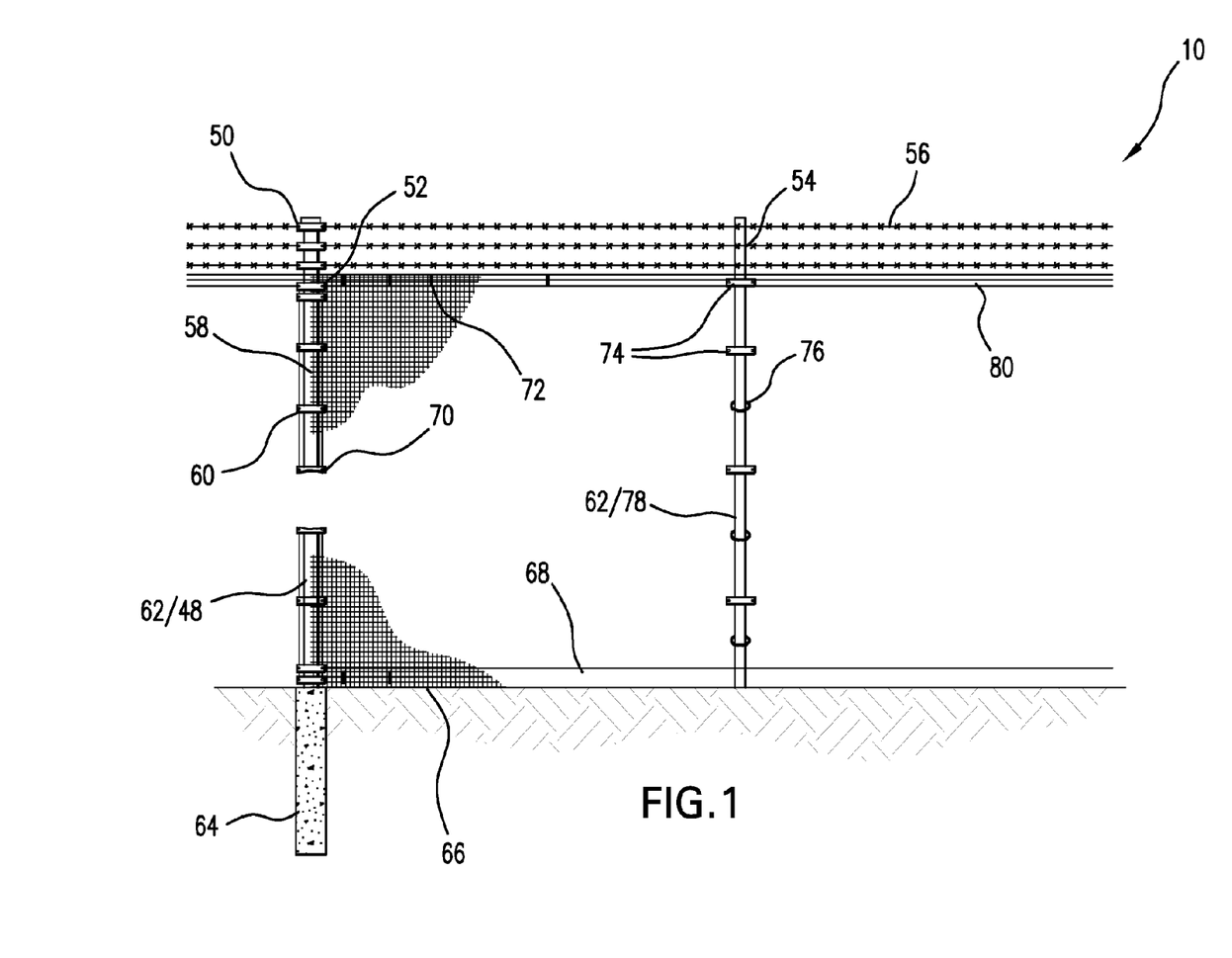
FIG. 1 illustrates a partial view of the non-metallic fence system of the present invention.

Referring to FIG. 1, a non-metallic fences system is shown. This fence system incorporates structural compositions of poly-glass, polyvinyl chloride (PVC), polyurethane, polypropylene, and other like non-reflective components within a stand alone barrier system. These structural compositions provide the physical material properties within the structural components that allow the non-metallic fence system 10 to be particularly useful in adverse environments that would rapidly degrade conventional steel or wood systems. These poly-glass, polyvinyl chloride (PVC), polyurethane, polypropylene resin composites are resistant to fire, chemicals, moister, salt environments and ultraviolet (UV) radiation. This provides a long term durability of the non-metallic fence system 10, at a relative low cost.

Significantly the non-metallic fence system 10 is invisible to RADAR. When installed at airports, the airport Flight Management Control System utilizing the RADAR, at the ends and sides of runways, is not hindered from a signature reflection from the non-metallic fence system 10. This decreases the level of confusion for flight management control personnel, separately located in control towers or other strategic locations, while they direct crews flying the aircraft to a safe landing during adverse weather or other visually imparted local conditions.

Referring again to FIG. 1, the non-metallic fence system 10 may include a rigid structure supported on a plurality of posts 62. Preferably the non-metallic fence system 10 preferably includes post 62 components configured as breakaway elements to the non-metallic fence system 10. As such, the posts 62 are modified to shear, or otherwise detach, from its base 64 connection when struck by a large moving object, such as an aircraft, aircraft support equipment or vehicles. Allowing the post to shear at ground level prevents physical damage to expensive equipment, and decreases the amount of damage to the non-metallic fence system 10 itself. Representative posts 62 include, without limitation, circular, oval, triangular, hexagonal, octagonal or square circumferences, with square circumferences most preferred, including representative circumferences such as ten, twelve, fifteen, or twenty inches. Posts 62 may be of the same or various sizes for a given non-metallic fence system 10, with different sized posts 62 being particularly useful between posts 62 providing separate structural functions, e.g., terminal posts 48, line posts 78, gate-framing posts 62, etc.

Once secured by the base 64 the posts 62 support a netting or intermittent screening fabric, or fencing mesh 66 comprising a plurality of wires composed of a poly-glass, polyvinyl chloride (PVC), polyurethane, polypropylene, and/or the like. Representative fabric 66 internal dimensional openings include, without limitation, one inch, one and one half inch, two inches, etc, wide openings, and one inch, one and one half inch, two inches, etc, high openings, such as, for example, one and one inch by one and quarter-inch opening present in a polypropylene fabric 66.

The fabric 66 is preferably attached to the individual posts 62 using a connector system. Connections include, for example, the fabric 66 overlapping the posts 62, shown at 58 in FIG. 1, attached with tension bands 60 to bar with non-metallic bolts, e.g., with three-eighths inch diameter. Additionally, two way steel bands 50 may be used, connected with steel bolts and plastic nuts 52 for two way rail band connections. Additional boundary components may be added to the non-metallic fence system 10, such as incorporating strands of barbed wire 56, shown in FIG. 1 as three strands, attached to the posts 62 with aluminized hook ties 54 and/or two-way steel bands 54, with the proper selection of post 62 sizes, any gauge of barbed wire 56, and other structural sizes determinable by those skilled in the art of perimeter boundaries.

Along the sides of the posts 62, a poly/glass tension bar 70 is located which is secured to the post 62 by tension bands 60 attached with non-metallic hardware. Preferably, a tension wire 68 tracks along the bottom edge of the fabric 66, which is sufficiently resilient to hold the fabric 66 in place and resist intrusion therethrough. Representative tension wires 68 include polymer coated steel wire compositions. The non-metallic fence system 10 may further include non-metallic bands 74, such as two way poly glass bands 74, for intermittent securing of the fabric 66 along the length of the non-metallic fence system 10, and/or tie wraps 76, which preferably is resistant to UV radiation exposure when present.

Figure 2A:
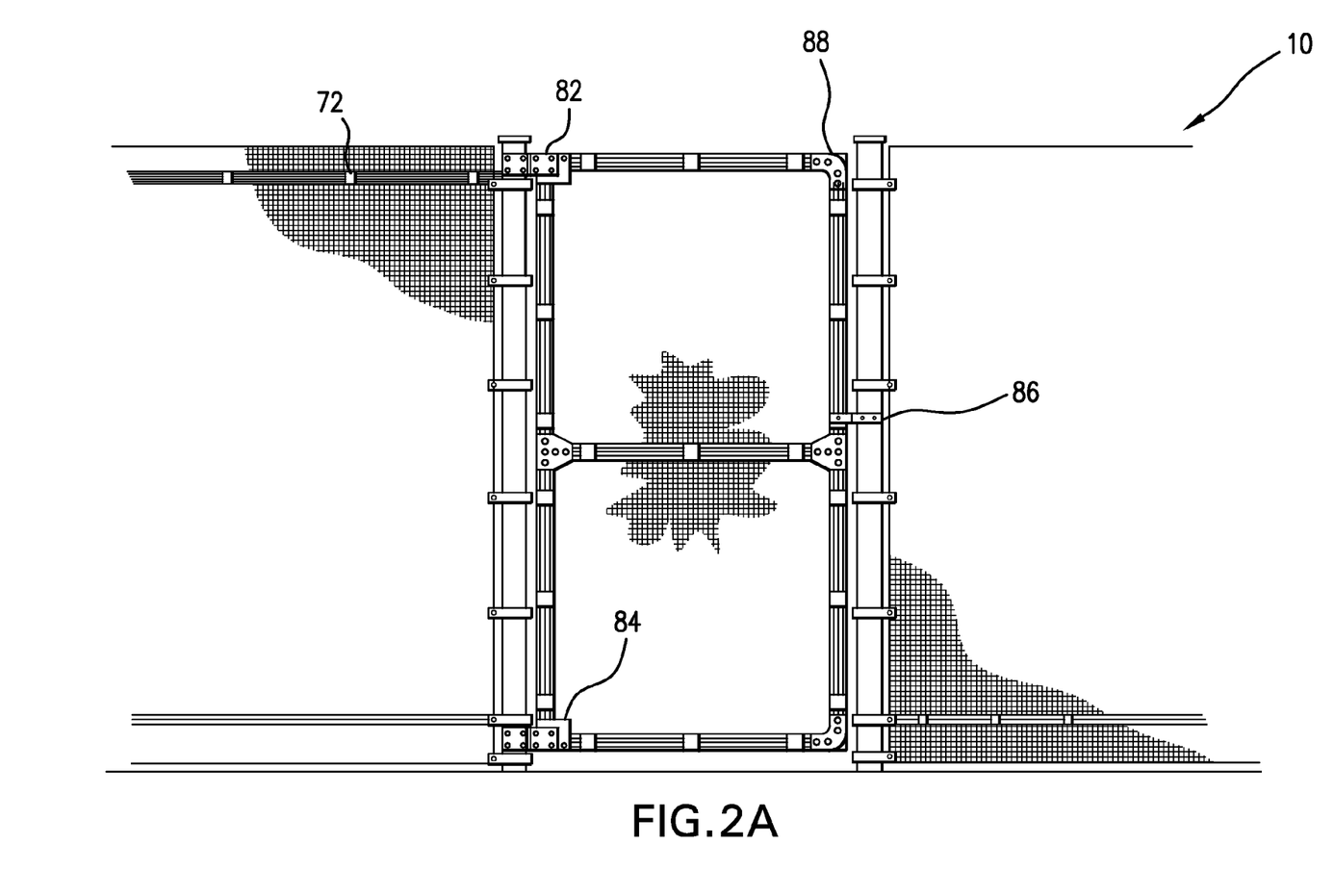
FIGS. 2a and 2b illustrate a gate opening within the non-metallic fence system of FIG. 1.
Figure 2B:
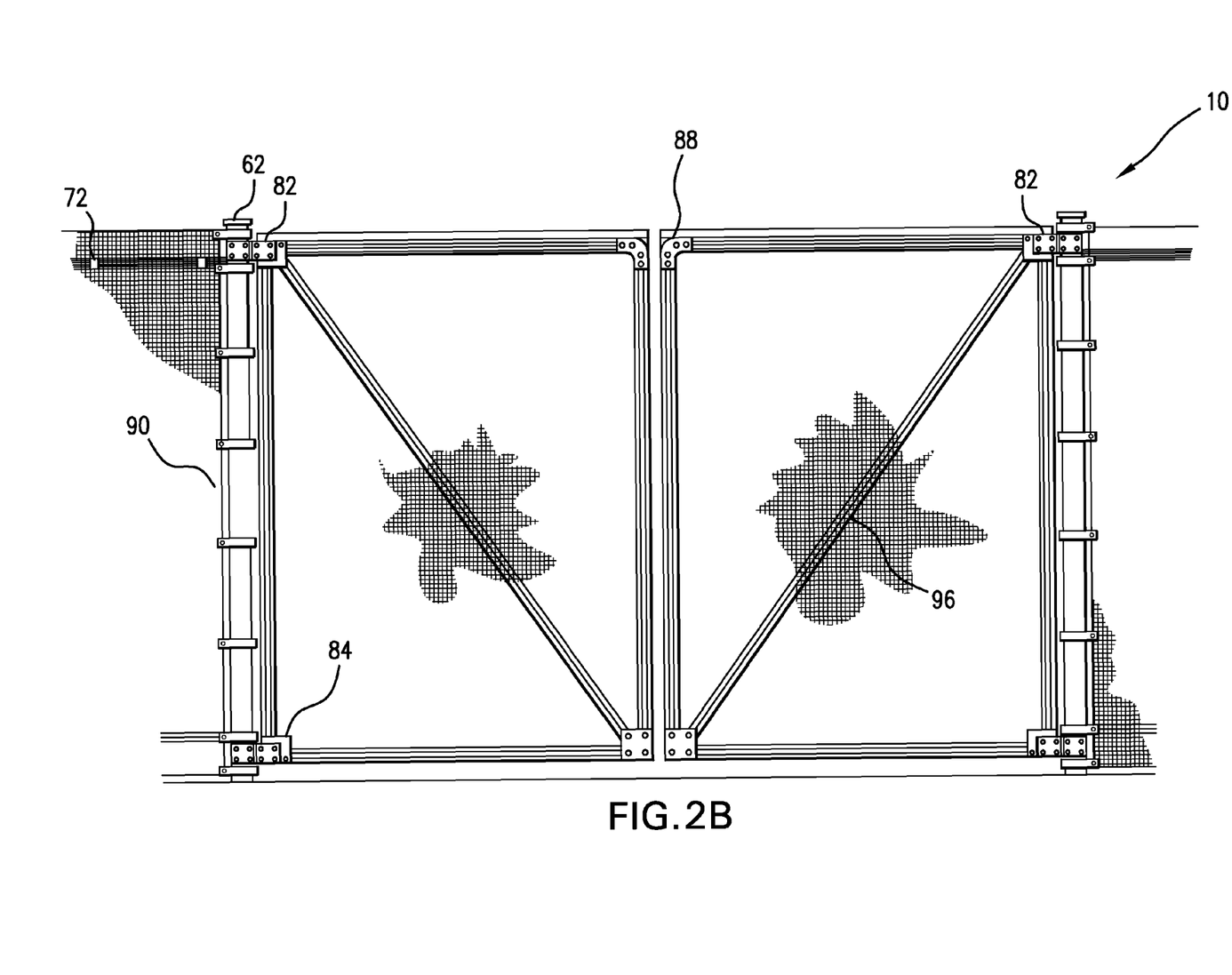
Figure 3:
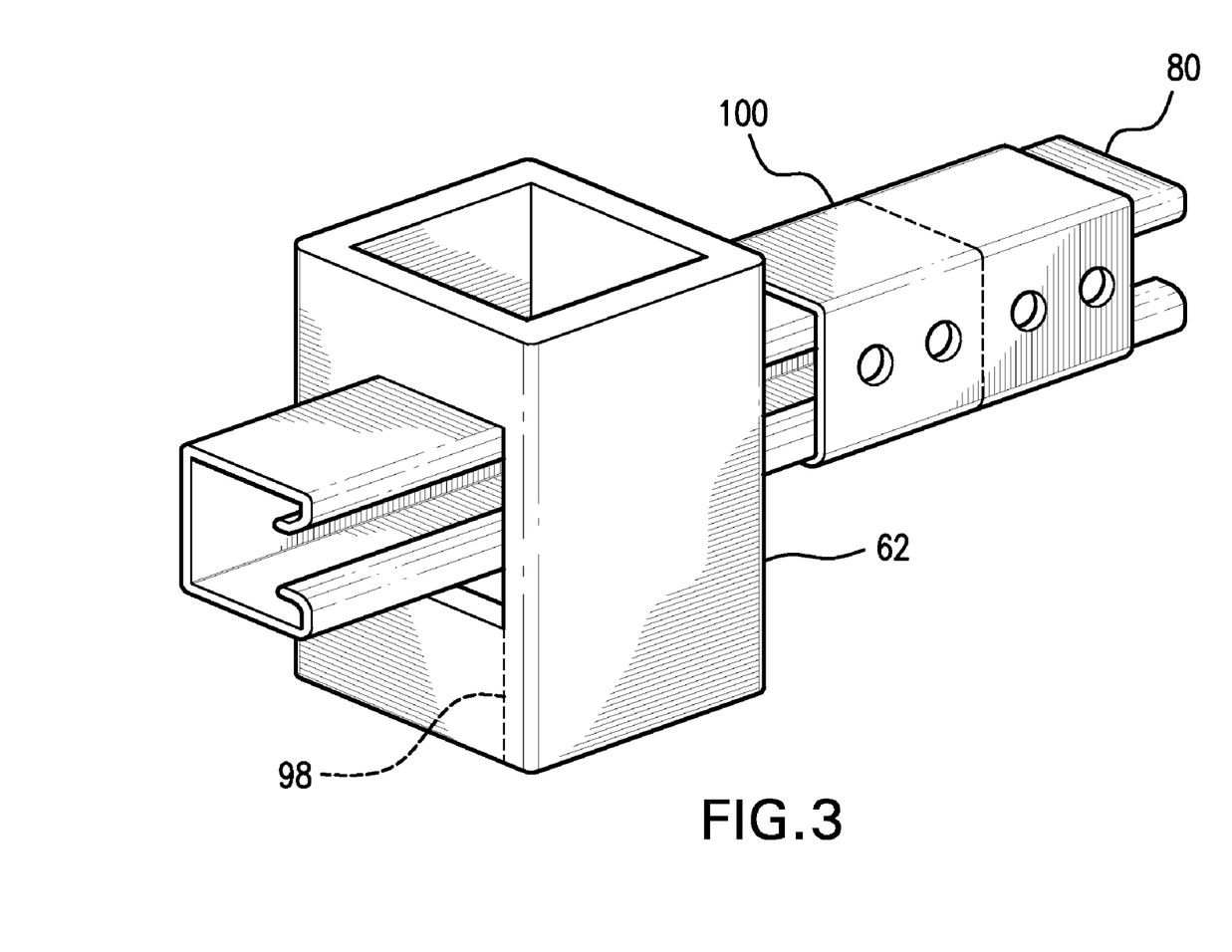
FIG. 3 illustrates the interconnection of a rail and post of the present invention.

Additionally, as seen in FIGS. 1, 2a and 2b, the non-metallic fence system 10 includes a rail 80, also referred to as an open face strut profile, extending between the individual posts 62. The rails 80 form a channel between a pair of opposing font faces of the rail 80 which extends into the hollow interior of the rail 80, the channel being defined by the inward extension of an inward angular return leg from both sides of the opening that form a sharp hook, on each side, allowing for additional material and thereby increasing the strength of the strut. The end point of each return leg comprises an abutment surface formed to abut portions of a securing device. Preferred compositions of the rails 80 include polyglass. These rails 80 are preferably supported within the non-metallic fence system 10 by inserting the rails 80 through holes or openings within the posts 62, which have been punched or formed along the horizontal length of the posts 62. In addition to a hole located at the top of the post 62, holes may be placed along the length of the post 62, and are generally positioned for allow either the extension of a single rail 80 to pass between multiple posts 62, or to allow the termination of one rail 80, and the beginning of a second rail 80 to meet within a single post 62. These opening extend from one side of the post 62 to the other side, allowing rails 80 to pass through the post 62. The punched holes within the posts 62 eliminate the need for fittings or special post-caps within the non-metallic fence system 10, while retaining the structural strength of the non-metallic fence system 10. For example, the top holes within the posts 62 allow the top rail 80 of the non-metallic fence system 10 to run continuously between terminal points at the top of each post 62. As detailed below, the rails 80 preferably includes an open face strut profile. The rails 80 are rotated 90 degrees from the ground to expose the open face strut profile, i.e., the openings in the "C" rails, along the surface of the non-metallic fence system 10 and as such turned to face the surface of the fabric 66.

Figure 4A:
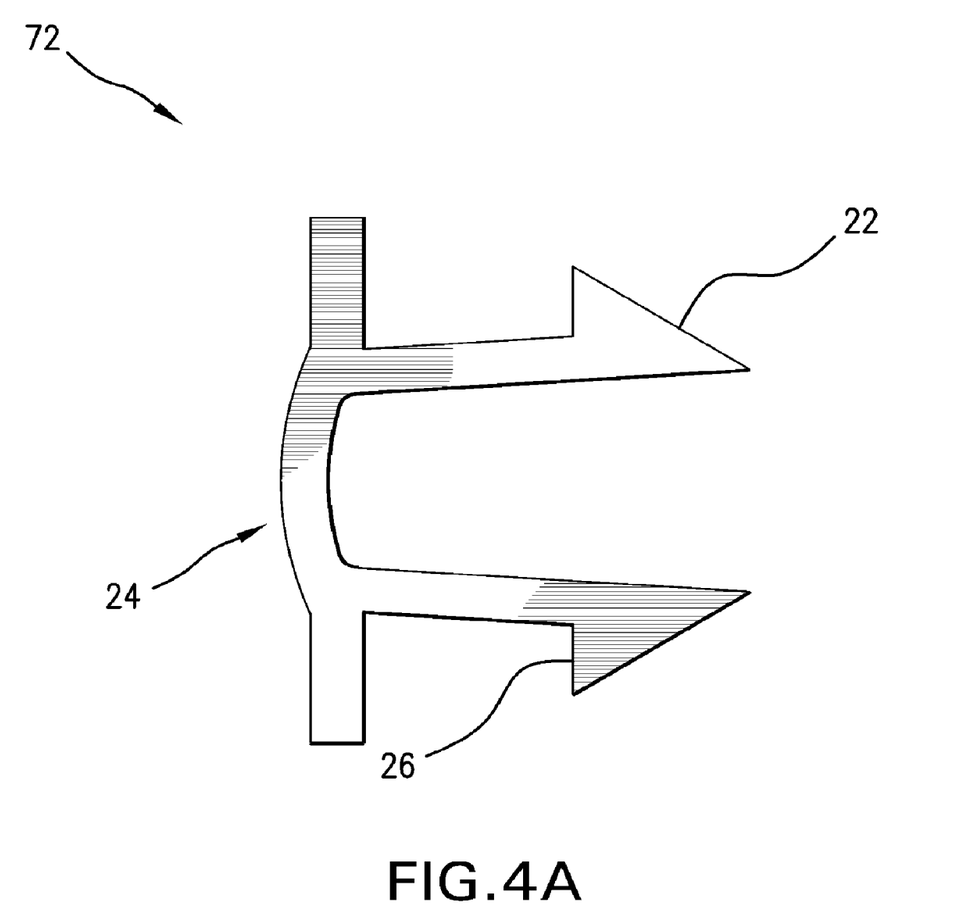
FIGS. 4a and 4b illustrate the snap lock device of the present invention.

The invention includes the construction of a physical security fence which incorporates a securing device, preferably a snap-lock clip 72 mechanism, affixed to an open face strut profile. FIGS. 1, 2a and 2b further show the placement of a novel snap-lock 72 mechanism of the present invention. This snap-lock 72, detailed in FIGS. 4 through 5C, is a push in locking device designed for securing the fabric 66 to the rail 62, e.g., the top, intermediate or bottom railing 80. In addition to the rail 80 and fabric 66, the snap lock 72 is non-metallic. The snap lock 72 returns are designed to integrate within the open face strut profile 80 for appropriate fitting therein. Once the snap lock 72 has been inserted to hold the fabric 66 along the rail 80, it can easily be removed. The snap lock may be manually, e.g., by hand/finger grasping, or using pliers or other gripping hand tools to impart a ninety degree (90°) twist to extract the snap lock from open face strut profile 80. Twisting may be either clockwise or counter-clockwise. Once turned, the snap lock 72 is pulled from the open face strut profile 80. Removal of the snap lock 72 allows for easy repair or replacement of a fence section, and the snap lock clip 72 may then be reinstalled into the open face strut 80.

Figure 4B:
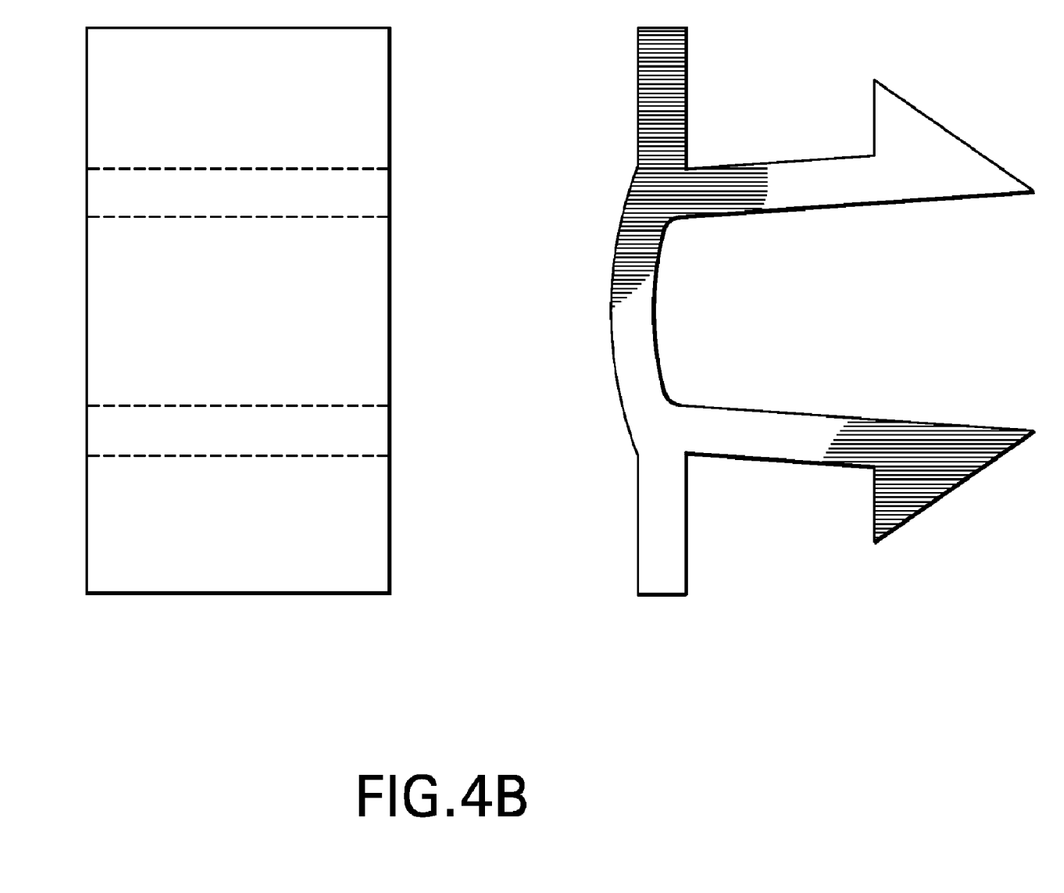
Figure 5A:
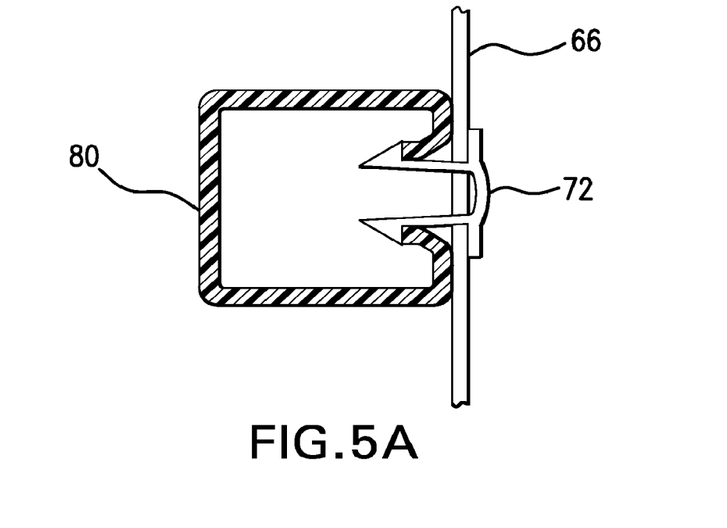
FIG. 5a-5d illustrate the use of the snap lock device with an open face strut profile present in a rail of the present invention.

Referring to FIG. 4B, the snap-lock 72 includes functional components to be operational within a fence system of the present invention. As seen in FIG. 4B1, the snap-lock 72 prongs 22 are attached to a backing (shown in FIG. 4B2), with the prongs 22 having a thickness 401, of 0.094 inches, to provide sufficient structural integrity to sustain the forces locking the snap-lock 72 to the strut (as seen in FIG. 5A). Dimension 414 of the snap-lock 72 is proportioned to ensure sufficient contact of the prongs 22 in the inside of the strut return.

Referring to FIG. 4B1, the depth 402 of the snap-lock 72 backing relates to the opening size of the strut, up to a ratio of 1:1, such as a dimension of 0.750 inches. The backing of the snap-lock 72 includes the contoured back 24 having an offset 403, such as 0.094 inches, that provides the snap-lock 72 with a spring/recoil property allowing the back prong surface 412 of the prongs 22 to engage with the underside of the strut. The length 404 of the snap-lock 72 backing allows the snap-lock 72 to capture the mesh profile with underside surface area of the snap-lock 72 backing 406, and thereby securing the mesh fabric to the engaged strut frame. Representative dimensions of the length 404 include 1.500 inches. Also shown, the distance 405 provides a length greater than the strut return allowing the surface 412 to contact and lock the snap-lock 72 on the underside of the strut. This distance 405 includes, for example, 0.530 inches. A backing surface 406 of the snap-lock 72 captures the mesh fabric for the fence structure allowing the full assembly to become a solid structure. The prongs 22 shown in FIG. 4B2 include an angle 407 of the prongs 22, such as sixty-three degrees (63°) from the perpendicular of the inner length of the prong. This angle 407 allows the user to insert the snap-lock 72 into the strut profile with the use of hand pressure. The angle 407 on the prongs 22 allows the snap-lock 72 to be inserted into the strut with direct hand manipulation. Using this lead angle 407 to guide the snap-lock 72 into the strut profile as well as compressing the prongs 22 along dimension 408, under spring pressure, to drive the snap-lock 72 into the strut. As the angle 407 increases, the surface 412 decreases, i.e., as the angle 407 approaches ninety degrees (90°), the size of surface 412 diminishes causing a lack of surface contact area for the snap-lock 72 to mesh to the strut profile. As the angle 407 decreases, the insertion force for the snap-lock increases. The prong opening 408 is dictated by the strut profile that equates to the prong thickness 401 of the snap-lock 72 subtracted from the opening dimension of the strut. A prong angle offset 409 includes an angle of six degrees (6°) for each prong 22, away from each other and perpendicular from the backing of the snap-lock 72, which protrude into the strut profile and creating a force to retain the snap-lock. The prong angle offset 409 creates a spring action force at constant pressure outward that secures surface 412 to the underside of the strut profile.

Also seen in FIG. 4B2, the size of surface 410 is directly related to dimensions of angle 407 and distance 405. As the surface 410 is forced into the return on the strut, driving forces act against the surface 410 force inward compression of the prongs 22. Head thickness 411 of the snap-lock 72, such as a thickness of 0.125 inches, retains sufficient structural integrity to sustain the forces locking the snap-lock 72 to the strut. The prong point 413 minimizes resistance to insertion of the prongs 22 into the strut profile.

As seen in FIGS. 3 through 5D, the invention includes the rail (open face strut profile of a beam) 80 used in fence construction. The open face strut profile may be inserted into an opening in the fence post 62, such as being the top rail of the fence, orientated for the open face portion of the strut to front one side of the fence relative to the post 60. Additional components, such as rail connecting sleeves, may be used. The snap lock 72 securing mechanism is preferably used to secure the fencing mesh 66 to the open face strut profile 80. The snap lock 72 includes a single piece component that fits into the open face strut profile 80 in a manner to secure the fence mesh 66 thereto. Preferably the snap lock 72 is composed of a polyvinyl chloride (PVC) composition. In use, the open face strut profiles, or rails, 80 are secured between end posts 62. The snap-locks 72 are individually fastened onto the rail 80 by aligning the prongs 22 into the open face strut and clipping and securing the prongs 22 into a bent-back portion of the beam forming the open face of the rail 80. Each prong 22 comprises a leg extending from the backing 24 and a head having a tapered surface facing away from the backing 24 and a back flat surface 26. A pair of clamping protrusions radially extends from opposing sides of the backing 24 and is planar with the prongs 22. In place, back flat surfaces 26 of the prongs 22 are abutted against the abutment surfaces of the return legs of the open face strut. As seen in FIG. 4A, the snap lock 72 preferably includes a bowed or contoured back 24, providing easier handling for removal, increased strength and increased visibility. The snap-locks 72 are spaced apart by a distance leaving gaps in between. Although the snap-locks 72 are preferably configured to fit into a single mesh unit of the fence meshing 66, alternatively the single unit snap-lock 72 may encompass a size for more than one mesh unit, preferably configured to secure multiple fence mesh 66 units along the length of the open face strut profile 80.

Figure 5B:
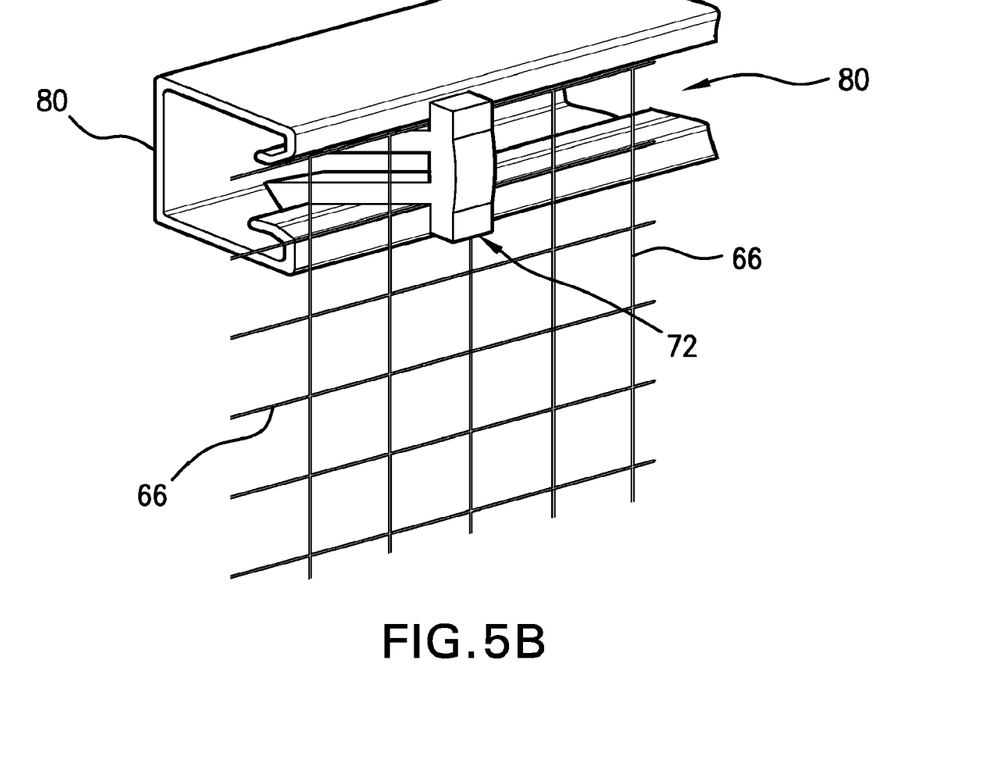
Figure 5C:
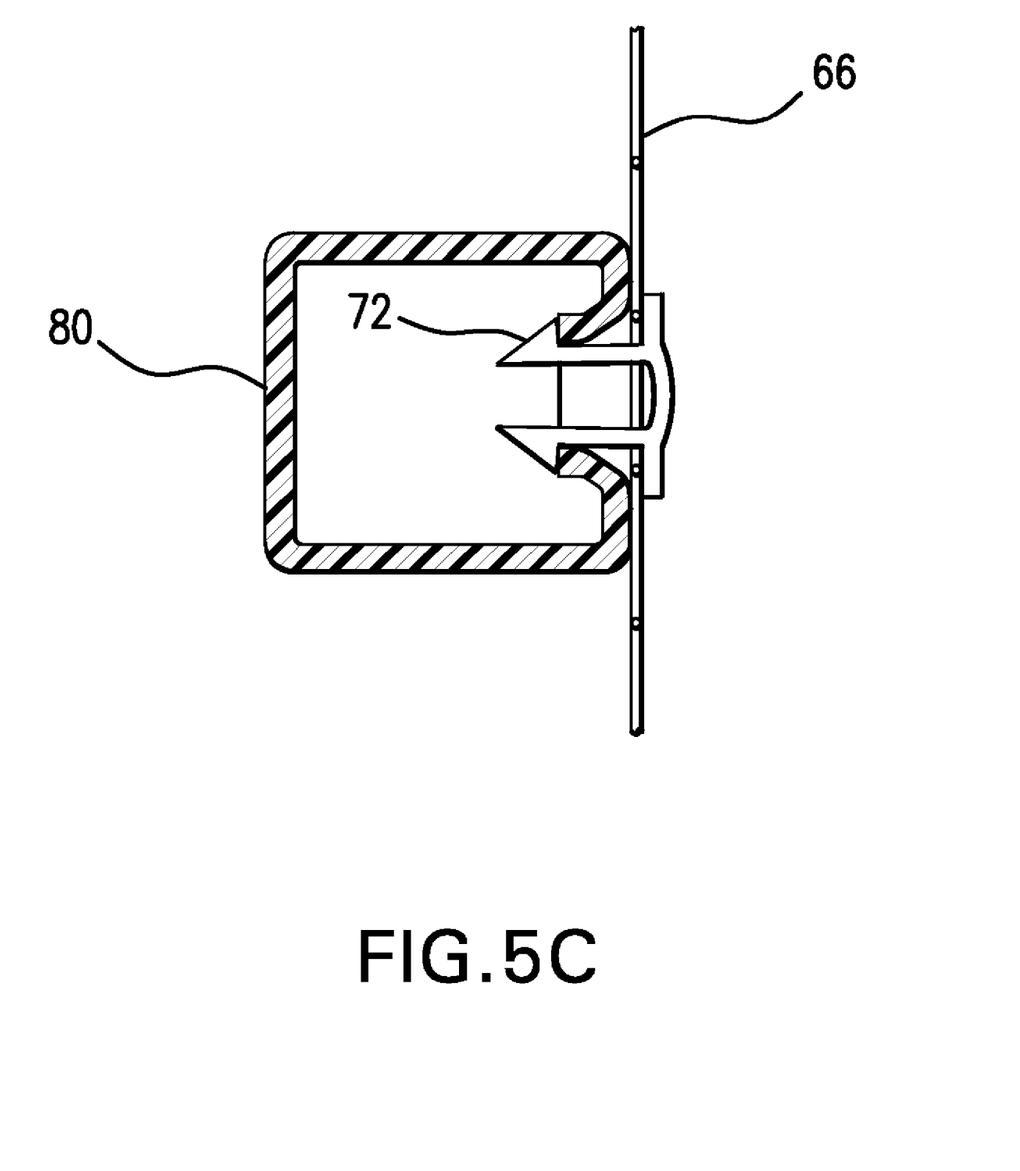
Figure 5D:
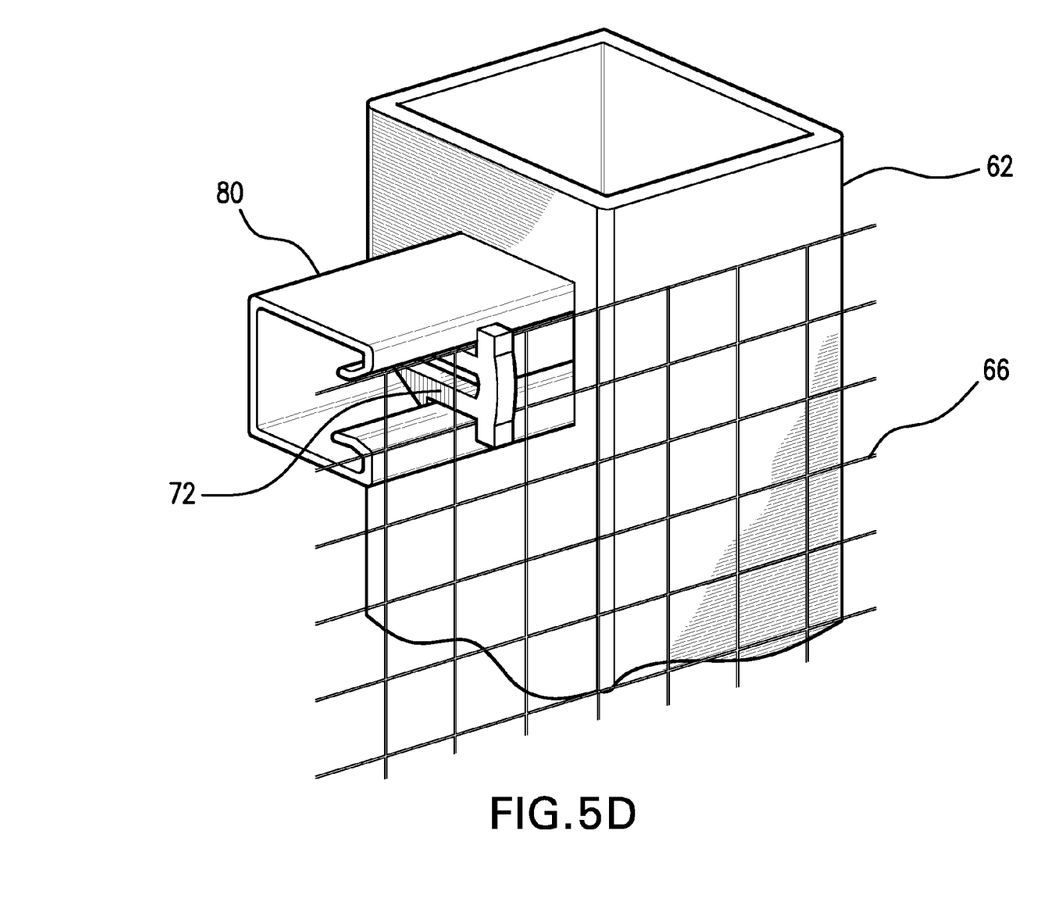

Referring to FIGS. 5a and 5b, when the snap-lock 72 clip is engaged with the open face strut profile and fits into the open face strut profile of beam 80, the fence mesh 66 is held against the planar abutment surfaces of the front faces of the rail 80 by the clamping protrusions of the snap-lock clip 72. As seen in FIG. 5b, the fence mesh 66 is preferably secured on the outer edges of the snap-lock clip 72, e.g., the prongs 22 of the snap-lock clip 72 fit into the open face strut locking it into place with the fence mesh 66 held between the clip and strut on the outer sections of the prongs 22.

The snap-lock clip 72, open face strut profile 80 and fence mesh 66, when assembled together, provides for a boundary fence apparatus. For example, the boundary fence may include fence mesh 66 connected to an upper and lower horizontal beams or rails having open face strut profiles, which are connected at their ends to end posts. The fence mesh 66 is secured along intervals to the open face strut profiles of the beams using the snap-lock clips 72. The prongs 22 of the snap-lock mechanism clip 72 into the horizontal upper and lower rails 80, locking it and the fence mesh 66 in place by way of of the back flat surfaces 26. As seen in FIGS. 2a and 2b, the non-metallic fence system 10 may form openings for gates or other passages for ingress or egress from a bounded area. In FIGS. 2a and 2b, a main gate incorporated into the non-metallic fence system 10 is shown framed by a terminal post 62. The boundaries of the main gate include a hinge 82 together with a corner support 84 to support a gate, having a pad lock 86 and reinforced with a corner bracket 88. As seen in the double swing gate of FIG. 2b, additional component may include brace supports 96 to further strengthen the gate. As seen in the figures, the snap lock 72 is present to secure the fabric 66 adjacent to the gate.

In operation, one the rail 80 has been properly placed within the post 62, and fabric 66 has been extended along the face of the open face strut profile, the snap lock 72 is inserted through the opening in the fabric 66 and into the open face strut profile. This locks the fabric 66 against the rail 80. Boulevards and/or two-way bands may additionally connect the fabric 66 to the line post 78, or attaching the intermediate rail 80 and/or bottom rail 80 to the line-post 78, simplifying the connection to line-post 78 by using channel nuts in the ends of railing, and eliminating the need for additional fittings. Tension bands, or rail end bands, are bolted to tension bars which sandwich the fabric 66 and hold tension on the fabric 66 when attached to terminal post 48. Tension bands and channel nuts are used to connect the ends of the railing 80 to the terminal-post 48 without the need for additional fittings. When needed additional hardware, e.g., nuts and bolts, are preferably composed of a polyurethane or other similar rigid material to make the entire non-metallic fence system 10 non-metallic. However, incidental stainless steel or other metallic components may be incidentally, and minimally, used, when desired, when such use does not hinder the performance of the non-metallic fence system 10.

The non-metallic fence system 10 includes a reduced number of components relative to conventional fence systems, reducing the complexity of installation. Additionally, it is particularly useful when used in restricted area environments that are subject to radar or sonar applications. Representative properties include, for example without limitation, fences for general physical barrier or safety including airports, chemical plants, water treatment facilities, electrical switch gear and transformers enclosures, and other like high-risk sites. The non-metallic fence system 10 provides a device for keeping areas clear of unwanted intrusions, providing safety to individuals and equipment. The non-metallic fence system 10 allows operational procedures along and through these perimeters not available with conventional fence systems. The non-metallic fence system 10 of the present invention is particularly useful to establish a clear line of demarcation of the boundary of property, and preventing ingress or egress to such bounded property. For observation purposes, line of sight along and through the non-metallic fence system is not restricted. In addition to providing a clear indication of where the property line begins and ends, the non-metallic fence system 10 prevents intrusion of the property, by humans, animals or traveling debris, into any prescribed sensitive area. Preventing intruders and animals from interring the restricted zone is a major concern. Additionally RADAR remains functional with the non-metallic fence system 10 present.

The foregoing summary, description, and examples of the invention are not intended to be limiting, but are only exemplary of the inventive features which are defined in the claims.

What is claimed is:

1. A non-metallic fence system comprising:

a plurality of posts;

a plurality of hollow elongated rails, each longitudinal end of each rail being supported by one of the plurality of posts, each of the plurality of rails comprising:

a back wall, a pair of opposing side walls longitudinally extending along the back wall, and a pair of front faces each longitudinally extending along a respective one of the side walls and defining a hollow interior of the rail;

the front faces extending toward and being coplanar with each other and each front face comprising an inwardly extending return leg longitudinally extending along an inner edge thereof and defining a channel extending into the hollow interior of the rail;

each front face having a planar abutment surface on an exterior surface thereof; and each return leg having an abutment surface on an inner surface thereof;

a planar fencing mesh comprising a first plurality of wires and a second plurality of wires intersecting the first plurality of wires and defining a plurality of openings, the first and second plurality of wires extending in a plane parallel to and abutting against the abutment surfaces of the front faces of the rails; and a plurality of snap-lock clips, each snap-lock clip comprising:

a planar body comprising a backing, a pair of opposing prongs longitudinally extending from the backing and defining a rotation axis of the clip, both prongs lying in a plane of the clip, the prongs diverging from each other and being outwardly resiliently biased from each other, and a pair of clamping protrusions extending radially outwardly from opposing sides of the backing;

each prong comprising a leg extending from the backing and a head having a tapered surface at a free end of the prong facing away from the backing and a back flat surface facing the backing;

wherein in a first locked position, the prongs of each snap-lock clip are inserted through a respective opening in the fencing mesh, aligned with a respective channel of one of the rails such that the plane of the clip is approximately perpendicular to the longitudinal extension of the channel, and inserted into the channel such that the tapered surfaces of the prong heads engage the inner edges of the front faces of the rail to resiliently compress the prongs toward each other, the prong heads being outwardly biased within the channel such that the back flat surface of each prong head engages the abutment surface of a respective return leg of the channel, clamping adjacent wires of the first or second plurality of wires of the fencing mesh between the clamping protrusions of the clip and the abutment surfaces of the front faces such that the fencing mesh is in parallel planar alignment with the front faces;

wherein in a second releasing position, each snap-lock clip is rotated about the rotation axis of the clip into a position offset by approximately 90° from the first locking position such that the prongs of the clip and the plane of the clip are longitudinally aligned with the channel and such that the back flat surfaces of the prong heads are out of contact with the return legs, allowing the release of the clip from the channel and separation of the fencing mesh from the abutment surfaces of the front faces of the rail.

2. The non-metallic fence system of claim 1, wherein the two prongs diverge twelve degrees from each other.

3. The non-metallic fence system of claim 1, wherein each prong longitudinally extends at an angle offset of six degrees from perpendicular to the backing of the snap-lock clip.

4. The non-metallic fence system of claim 1, wherein the tapered surface of each prong has an outer tip surface oriented sixty-three degrees from perpendicular to the longitudinal extension of the prong leg.

* * * * *